United States Patent
Kondo

(10) Patent No.: US 7,586,406 B2
(45) Date of Patent: Sep. 8, 2009

(54) WINKER UNIT FOR VEHICLE WITH HAZARD MAINTAINING FUNCTION

(75) Inventor: Tetsuya Kondo, Saitama (JP)

(73) Assignee: Honda Motor Co., Ltd., Tokyo (JP)

(\*) Notice: Subject to any disclaimer, the term of this patent is extended or adjusted under 35 U.S.C. 154(b) by 299 days.

(21) Appl. No.: 11/586,660

(22) Filed: Oct. 26, 2006

(65) Prior Publication Data

US 2007/0096893 A1 May 3, 2007

(30) Foreign Application Priority Data

Oct. 31, 2005 (JP) .............................. 2005-317757

(51) Int. Cl.
*B60Q 1/52* (2006.01)
(52) U.S. Cl. ...................................... 340/471
(58) Field of Classification Search ................ 340/471, 340/475, 472, 478, 661, 664; 361/86, 87; 307/10.8
See application file for complete search history.

(56) References Cited

U.S. PATENT DOCUMENTS

| | | | |
|---|---|---|---|
| 4,380,753 A | * | 4/1983 | Gant ........................... 340/471 |
| 5,309,142 A | * | 5/1994 | Fritz .......................... 340/471 |
| 5,805,061 A | | 9/1998 | Fritz et al. |
| 6,243,009 B1 | * | 6/2001 | Fritz et al. .................. 340/471 |
| 6,927,683 B2 | * | 8/2005 | Sugimoto et al. ........... 340/475 |
| 2004/0095234 A1 | | 5/2004 | Sugimoto et al. |

FOREIGN PATENT DOCUMENTS

| | | |
|---|---|---|
| EP | 0 807 550 A2 | 11/1997 |
| JP | 52-85499 | 7/1977 |
| JP | 8-183388 A | 7/1996 |
| JP | 11-263164 A | 9/1999 |

\* cited by examiner

*Primary Examiner*—Phung Nguyen
(74) *Attorney, Agent, or Firm*—Birch, Stewart, Kolasch & Birch, LLP

(57) ABSTRACT

A winker assembly for a vehicle has a hazard maintaining function that can maintain a hazard state even if a key is removed when moving away from the vehicle, with a comparatively simple and inexpensive structure. If a hazard switch is turned on with the ignition switch in an on state, the LOAD terminal of the winker relay is connected to the winkers, and all the winkers are flashed to give a hazard state. The winker relay is provided with a current detection circuit for detecting current flowing in the winkers, and a maintaining circuit for maintaining a winker flashing signal based on detected current, and when it has been determined that detected current is equivalent to four winker lamps being lit current for flashing the winkers is maintained even after the ignition switch is turned off.

18 Claims, 7 Drawing Sheets

WINKER UNIT FOR VEHICLE WITH HAZARD MAINTAINING FUNCTION

CROSS-REFERENCE TO RELATED APPLICATIONS

This nonprovisional application claims priority under 35 U.S.C. § 119(a) on Patent Application No. 2005-317757, filed in Japan on Oct. 31, 2005, the entirety of which is incorporated herein by reference.

BACKGROUND OF THE INVENTION

1. Field of the Invention

The present invention relates to a winker unit for a vehicle with a hazard maintaining function.

2. Description of Background Art

With a vehicle, such as a motorcycle, a hazard mechanism is provided for driving a winker relay by operation of a hazard switch to simultaneously flash front and rear left and right winkers in order for other vehicles to be able to recognize the state of the vehicle when temporarily stopped on the roadway at the time of an emergency (See, for example, Japanese patent Laid-open No. Sho. 52-85499).

The hazard mechanism disclosed in Japanese patent Laid-open No. Sho. 52-85499 is provided with a relay having a contact connected in parallel with a main switch, and that is driven by operation of a hazard switch only when the main switch is on. If the hazard switch is operated with the main switch in an on state, the relay is driven to close the contact, and it is possible to supply power to the winkers via the contact even if the main switch is layer turned off. Furthermore, by opening the contact if the hazard switch is released, the hazard function does not operate even if the hazard switch is operated after that with the main switch in an off state. Accordingly, it is possible to maintain the hazard condition even if the key is taken out when moving away from the vehicle, and it is possible to prevent winker flashing due to the mischievous behavior of other people.

However, the vehicle hazard mechanism disclosed in Japanese patent Laid-open No. Sho. 52-85499 requires a relay for the hazard maintaining function in addition to the winker relay. This causes an increase in the number of components and the number of wires, and associated increase in cost.

SUMMARY OF THE INVENTION

The present invention has been conceived in view of the above-described situation, and an object of the present invention is to provide a winker unit for a vehicle with a hazard maintaining function that can maintain a hazard state even if a key is removed when moving away from the vehicle, with a comparatively simple and inexpensive structure.

In order to achieve the above described object, a first aspect of the present is directed to a winker unit for a vehicle with a hazard maintaining function, comprising a main switch for turning a power supply of the vehicle on or off as a result of key operation, a winker relay for outputting current for flashing left and right winkers of the vehicle, a winker switch for selectively connecting output of the relay to either the left or right winker, and a hazard switch for collectively connecting output of the winker relay to the left and right winkers, wherein the winker relay is normally connected to the power supply, and when the main switch is turned off under specified conditions current for flashing the winkers is maintained.

According to a second aspect of the present invention, the winker relay is provided with a current detection section for detecting current for flashing the winkers, and when a first specified current equivalent to a case where the hazard switch is on has been detected by the current detection section, the winker relay maintains current for flashing the winkers.

According to a third aspect of the present invention, when a second specified current equivalent to a case where any of the winkers are disconnected has been detected by the current detection section, the winker relay outputs a current for flashing the winkers at a different rate than at the normal time.

According to a fourth aspect of the present invention, when the hazard switch has been turned off in a state where current for flashing the winkers is being maintained, the winker relay does not output current for flashing the winkers, even if the hazard switch is turned on again.

According to a fifth aspect of the present invention, the winker relay is provided with a timer section for measuring a time a current for flashing the winkers is maintained for, and when the time measured by the timer section is in a first specified range the winker relay maintains current for flashing the winkers by tuning the hazard switch on again after it has been turned off.

According to a sixth aspect of the present invention, the hazard switch is connected in parallel with the winker switch.

According to a seventh aspect of the present invention, the winker relay is constituted by an IC.

According to the first aspect of the present invention, the winker relay is normally connected to the power supply, and when the main switch is turned off under specified conditions current for flashing the winkers is maintained. Therefore, current for flashing the winkers is sustained from the winker relay even if the main switch is turned off in the hazard state. Accordingly, it is possible to maintain the hazard condition even if the key is taken out when moving away from the vehicle, and it is possible to prevent winker flashing due to the mischievous behavior of other people, with a comparatively simple and inexpensive structure, without the need for separate provision of a relay for a hazard maintaining function.

According to the second aspect of the present invention, the winker relay is provided with a current detection section for detecting current for flashing the winkers, and when a first specified current equivalent to a case where the hazard switch is on has been detected by the current detection section. Therefore, the winker relay maintains current for flashing the winkers, the winker relay determines the hazard state by detecting current flowing in the winkers, and the hazard state is maintained even after the main switch is turned off. In this way, it is possible to construct a comparatively simple and inexpensive vehicle winker unit with a hazard maintaining function without the need to separately provide a relay for the hazard maintaining function.

According to the third aspect of the present invention, when a second specified current equivalent to a case where any of the winkers are disconnected has been detected by the current detection section, the winker relay outputs a current for flashing the winkers at a different rate than at the normal time. Therefore, it is possible to issue a warning by also using the current detection section to detect disconnection of a winker, and it becomes possible to detect disconnection without increasing the number of components.

According to the fourth aspect of the present invention, after the hazard switch has been turned off in a state where current for flashing the winkers is being maintained, the winker relay does not output current for flashing the winkers, even if the hazard switch is turned on again. Therefore, it is possible to prevent unintentional activation of the hazard function.

According to the fifth aspect of the present invention, the winker relay is provided with a timer section for measuring a time a current for flashing the winkers is maintained for, and when the time measured by the timer section is in a first specified range the winker relay maintains current for flashing the winkers by turning the hazard switch on again after it has been turned off. Therefore, it is possible to easily return to the hazard state even if the main switch has not been operated if the time is short, when the hazard switch is erroneously turned off while the hazard state is being maintained.

According to the sixth aspect of the present invention, the hazard switch is connected in parallel with the winker switch. Therefore, it is possible to supplement the hazard function by carrying out simple wiring to an already existing winker unit.

According to the seventh aspect of the present invention, the winker relay is constituted by an IC. Therefore, it is possible to construct a small sized, lightweight winker relay with a reduced number of components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
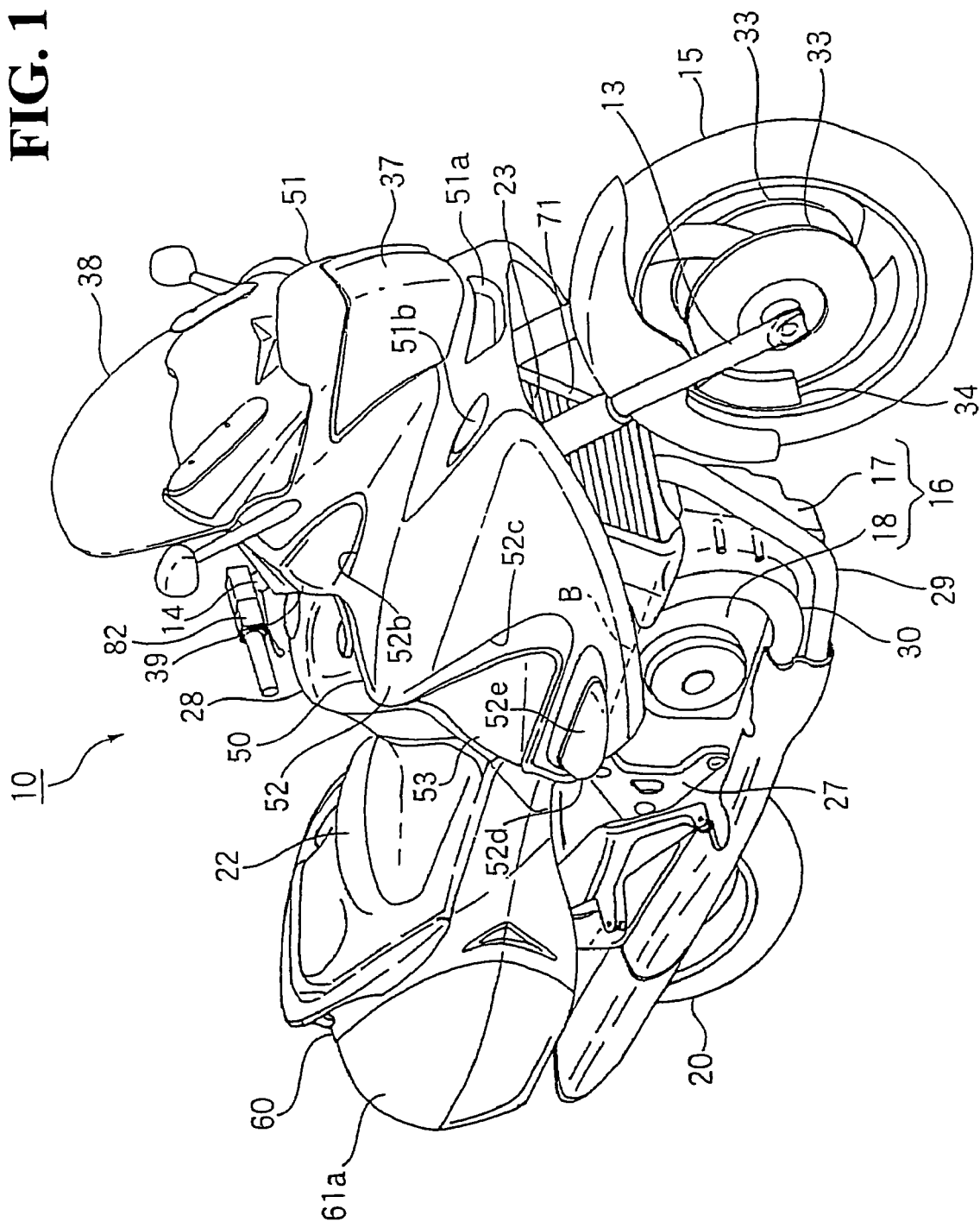
FIG. 1 is a perspective drawing showing a motorcycle on which a winker unit for a vehicle with a hazard maintaining function of the present invention is mounted viewed obliquely from the front.

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Figure 2:
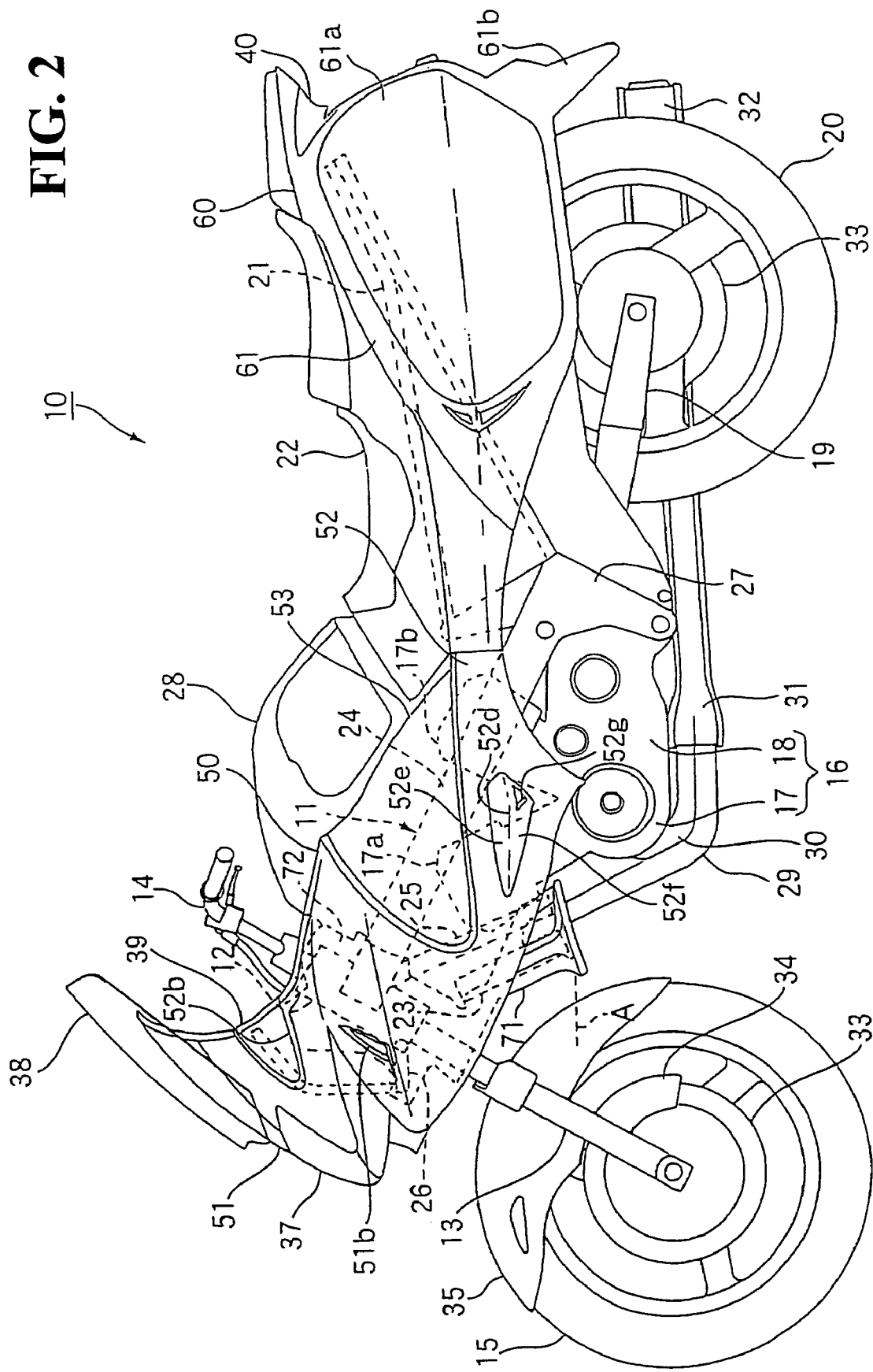
FIG. 2 is a side elevation of the motorcycle shown in FIG. 1.
Figure 3:
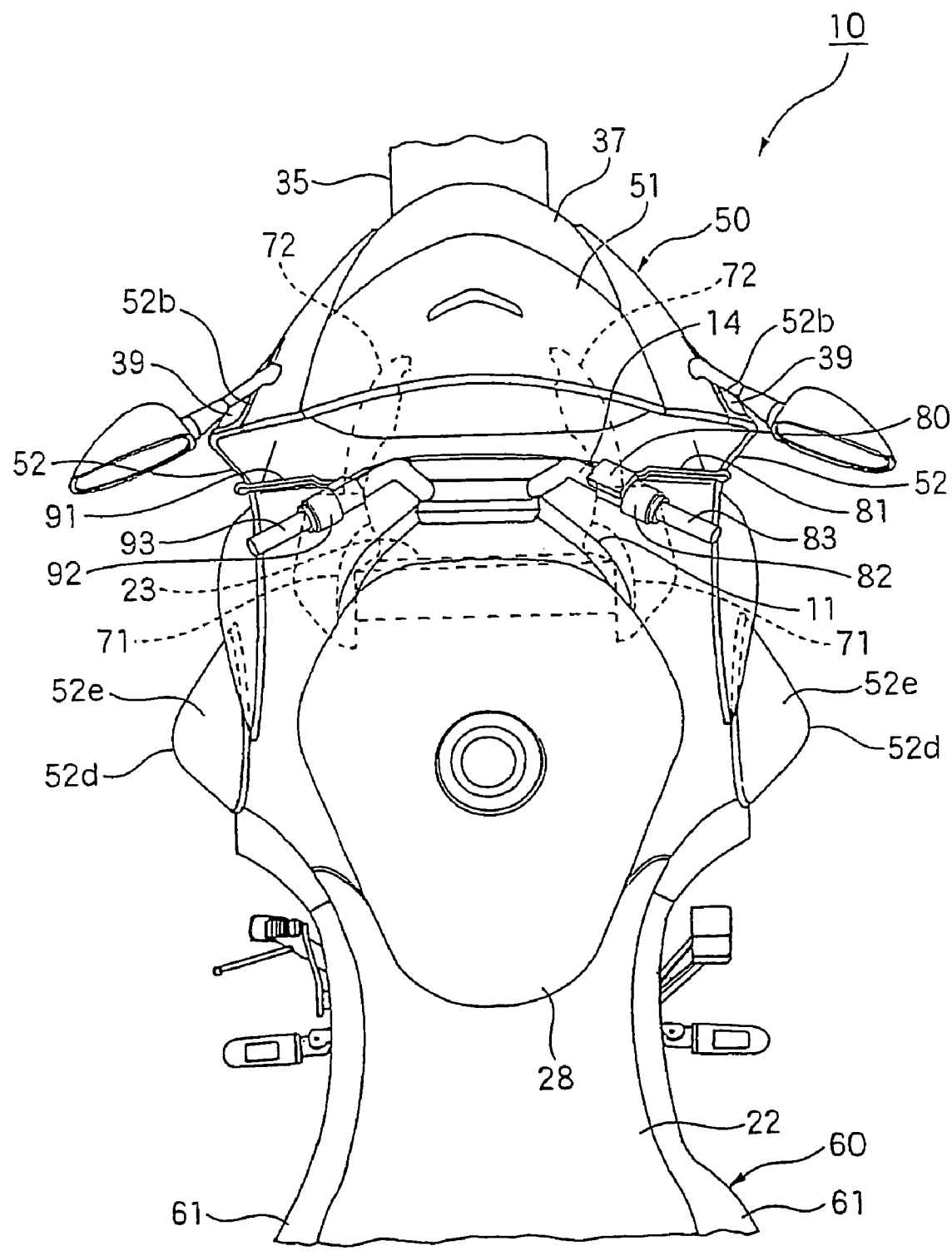
FIG. 3 is a plan view of the motorcycle shown in FIG. 1.

FIG. 1 to FIG. 3 show a motorcycle on which a winker unit (or blinker unit) for a vehicle with a hazard maintaining function of the present invention is mounted. A motorcycle 10 mainly comprises a frame 11, a front fork 13 attached to a head pipe 12 on a front end section of the frame 11, a handlebar 14 linked to an upper part of the front fork 13, a front wheel 15 attached to a lower part of the front fork 13, a power unit 16 made up of an engine 17, attached to a front lower part of the frame 11, and a transmission 18, a swingarm 19 attached to a rear lower part of the frame 11, a rear wheel 20 attached to the swingarm 19, and a tandem seat 22 attached via a seat rail 21 to a rear upper part of the frame 11, with the rear wheel 20 being driven by the power unit 16.

Also, the motorcycle 10 is provided with a radiator 23 in front of and below the frame 11. A front cowling 50 covers the front and both sides of the frame 11. A rear cowling 60 covers the rear and both rear sides of the frame 11. Left and right inner cowlings 72, 72 that are integral with a radiator cover 71 surround the radiator 23 and are attached to the inner sides of the front cowling 50. The front cowling 50, rear cowling 60 and inner cowlings 72, 72 are formed by a composite resin such as lightweight FRP as a raw material.

The frame 11 has a pair of left and right main frames 24 formed in a substantial U-shape by casting an aluminum alloy, etc, and extending downwards towards the rear. There is a cylindrical head pipe 12 on a front end part of these main frames 24. There are also a down tube 25 joined to the front end of the main frames 24 and extending rearward down to the rear of the head pipe 12, a front bracket 26 extending upwards in a substantially L shape in front of the head pipe 12, and a pivot plate 27 arranged at a lower rear end section of the main frame 24 adjoined to a front end section of the seat rail 21 extending rearward upwards.

The power unit 16 has an engine 17, that is a water cooled four stroke OHC three valve V-type two cylinder engine, integrally houses the transmission 18 internally. The power unit is supported by the main frames 24, pivot plate 27 and down tube 25. A fuel tank 28 is attached to an upper part of the power unit 16, above an air cleaner (not shown). The engine 17 has a carburetor (not shown) connected to intake ports of a front cylinder side cylinder head 17a and a rear cylinder side cylinder head 17b. An exhaust pipe 29 of the front cylinder side cylinder head 17a and an exhaust pipe 30 of the rear cylinder side cylinder head 17b are connected to collecting ducts at a lower part of the engine 17, and connect from the collecting ducts 31 to a muffler 32. Output of the transmission 18 is extracted at a side section and then conveyed via a chain (not shown) to a sprocket fixed to the rear wheel 20.

A front suspension (not shown) made up of a coil spring and a damper is built into the front fork 13. A caliper 34 for feeding a braking force to a pair of disk rotors 33 is fixed to the front wheel 15. A fender 35 for covering an upper part of the front wheel 15 is attached to the front fork 13. The swing arm 19 is swingably supported by the pivot plate 27, and is buffered by a rear suspension (not shown) comprised of a coil spring and a damper arranged between the frame 11. A disk rotor 35 is attached to the rear wheel 20 in the same manner as with the front wheel 15.

The radiator 23 is bolted to the down tube 25 behind the front wheel 15 and in front of the front cylinder side cylinder head 17a of the engine 17, and has the surroundings of the side section covered by a radiator cover 71 formed below the inner cowlings 72, 72.

The front cowling 50 comprises a front center cowling 51, left and right outer cowlings 52, 52, and left and right middle cowlings 53, 53. The front center cowling 51 has a headlight unit 37 attached to a front surface section, with a center air inlet 51a being provided below the headlight unit 37. Left right symmetrical side air inlets 51b and 51b are provided on both sides of the center air inlet 51a.

The front center cowling 51 is arranged at the front edges of the left and right outer cowlings 52, 52, and between the two, and is bolted to the front bracket 26. The center air inlet 51a is arranged above the front wheel 15 at a front edge center section, and so introduces air from the front while traveling and supplies air to an air cleaner. The side air inlets 551b, 51b are arranged above the front wheel 15 at a front edge center section, and so some of the traveling wind during travel flows towards the left and right middle cowlings 53, 53.

A windscreen 38 is fixed above the front cowling 51, and a meter unit (not shown) that is fixed to the front bracket 26 is arranged at the inner side of the front center cowling 51. By combining the front center cowling 51 with the left and right outer cowlings 52, 52, traveling wind during travel is received from the front and downforce is imparted to the front wheel 15.

The left and right outer cowlings 52, 52 are formed left right symmetrical, and here only the left cowling 52 will be described. The outer cowling 52 is arranged covering the side section of the head pipe 12, front side section of the main frame 24, and side sections of the two cylinder heads 17a, 17b of the engine 17, and is bolted to the main frame 24, pivot plate 27 and front bracket 26.

On the outer cowling 52 there are provided a side winker cutaway 52b arranged at an upper section, a middle cowl cutaway 52c, and a projection section 52d arranged bellow the middle cutaway 53.

A pair of side winkers 39 bolted to the front bracket 26 are fitted into the side winker holes 52b.

The middle cowling 53 bolted to the main frame 24 is attached in the middle cowling cutaway 52c. The middle cowling 53 has a slit-shaped opening (not shown) oriented towards the side air inlets 51b of the front center cowling 51, which means that traveling wind introduced from the two side air inlets 51b, 51b flows to the rear along the side surface of the vehicle.

The projecting section 52d is an inverted triangle shape looking from the side of the vehicle, defines a blade shape from the front towards the rear, and bulges out toward the outer side of the vehicle as a position to the rear side of the radiator 23. This projecting section 52d has an upper surface 52e forming an upper part that is arranged substantially horizontally, a lower surface 52f forming a lower side arranged downwards to the rear, and an air outlet 52g offset to the rear of the lower surface 52f.

A side cowling 61 of the rear cowling 60, having left right symmetrical side bags 61a, and a rear fender 61b, is attached behind the outer cowling 52. A pair of rear combination lamps 40 are attached to a rear upper end section of the rear cowling 60.

As shown in FIG. 3, reservoir tanks 80, brake lever 81, switch box 82, and handle grip 83 are provided in the right handlebar 14. On the other hand, a clutch lever 91, rotatably supported in a clutch lever holder, a switch box 92 and a handle grip 93 are provided in the left handlebar 14.

Figure 4:
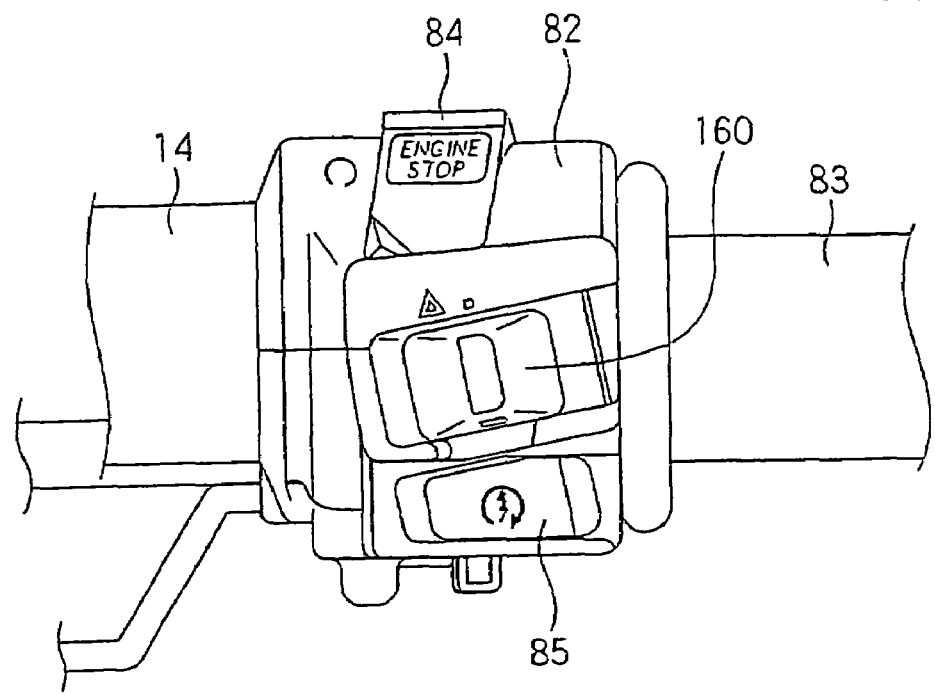
FIG. 4 is front elevation showing a switch box attached to the right handlebar of the motorcycle.
Figure 5:
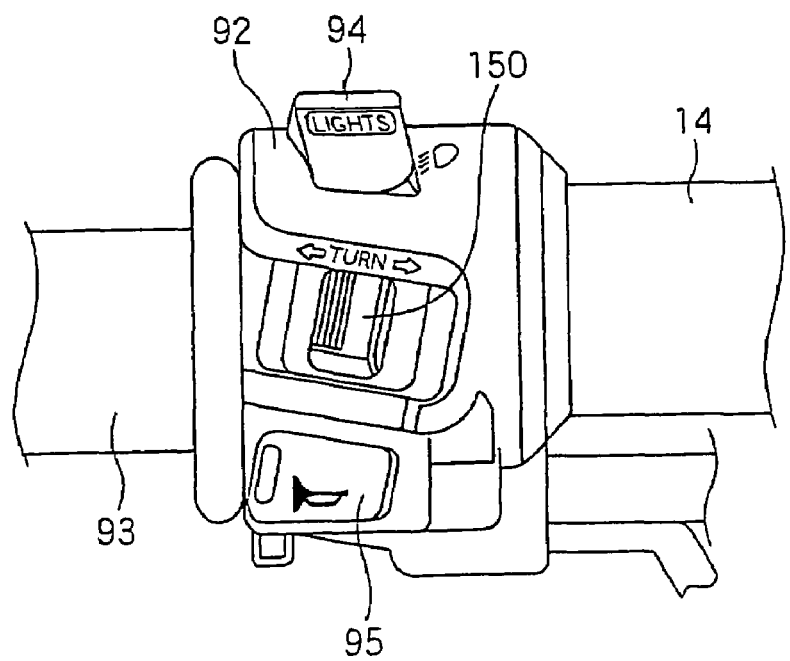
FIG. 5 is front elevation showing a switch box attached to the right handlebar of the motorcycle.

As shown in FIG. 4, the switch box 82 is provided with an engine stop switch (kill switch) 84 for stopping the engine by pushing down to the front, a starter switch 85 for starting the engine by rotating a starter motor by pressing, and a rear hazard switch 160 operated by being slid to the left side, are provided on the switch box 82. On the other hand, as shown in FIG. 5, the switch box 92 is provided with a dimmer switch 94 for switching the vertical direction of the headlight unit 37, a horn switch 95 for sounding a horn by pressing, a passing switch, not shown, positioned to the rear side, and a winker switch 150 that will be described later, etc.

Figure 7:
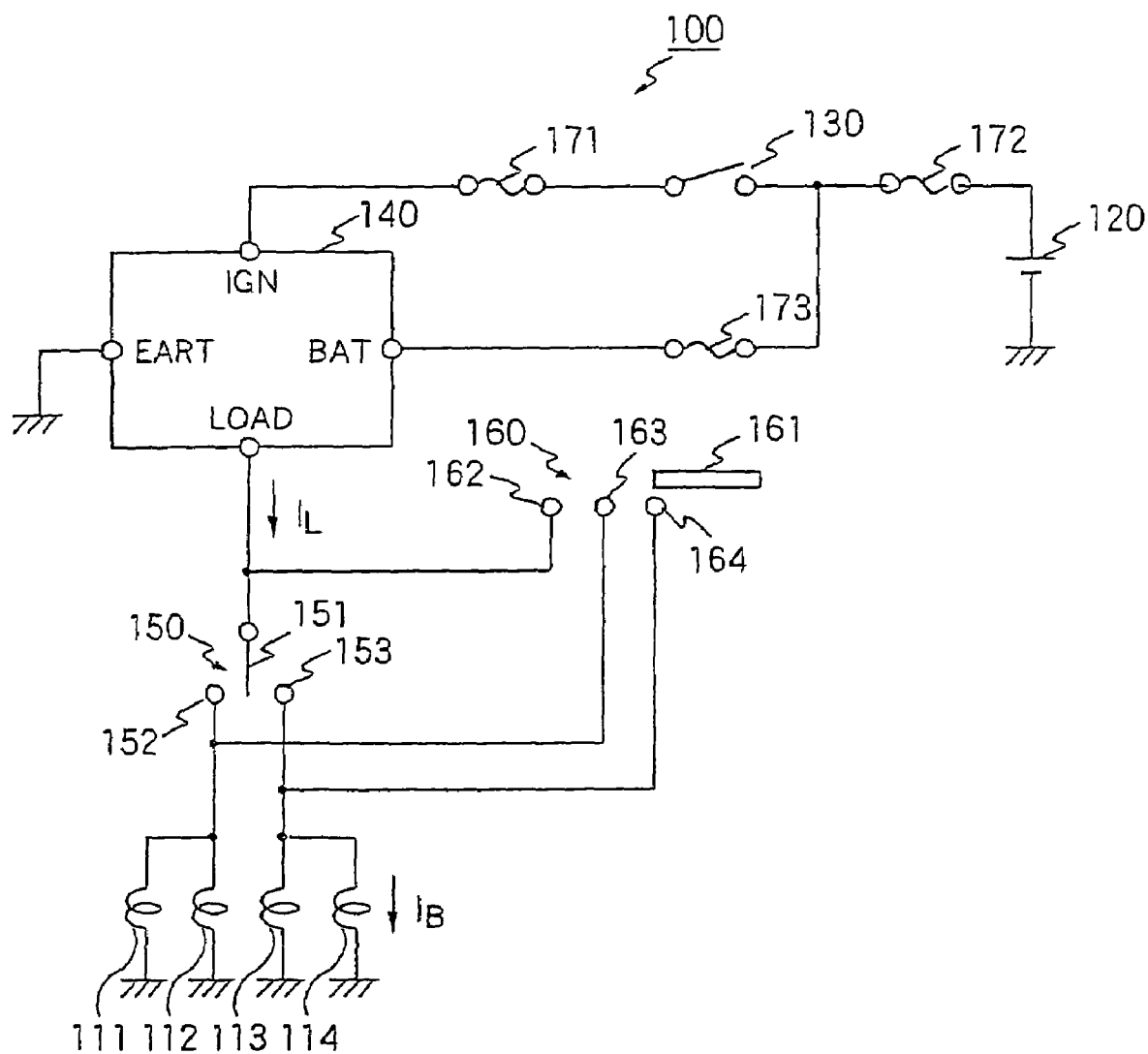
FIG. 7 is a block diagram showing the schematic structure of a winker unit for a motorcycle of the present invention.

FIG. 7 is a block diagram showing the schematic structure of a winker unit with a hazard maintaining function of this embodiment incorporated into the above described motorcycle 10. In FIG. 7, the winker unit 100 is made up of winkers 111-114 provide on the left and right to the front and rear, a battery 120, being a power source for the vehicle, an ignition switch 130, being a main switch for tuning on and off the power supply supplying power from the battery using a key operation, a winker relay 140 for outputting a flashing signal to the winkers 111-114, a winker switch 150 for selectively connecting output of the winker relay 140 to either of the left and right winkers 111, 112 and 113, 114, a hazard switch 160 for connecting the output of the winker relay to all of the left and right winkers 111-114, and fuses 171-173. The left and right winkers 111-114 also serve as hazard lamps. Also, the winker 111 is arranged on the left side winker 39 of the motorcycle 10, the winker 112 is arranged on the left rear combination lamp 40, the winker 113 is arranged on the right side winker and the winker 114 is arranged on the right rear combination lamp 40.

Figure 6A:
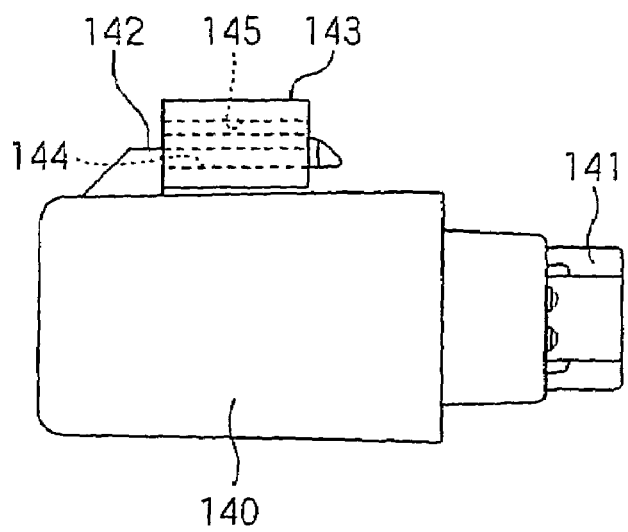
FIG. 6(a) is a front elevation of a winker relay of the present invention.
Figure 6B:
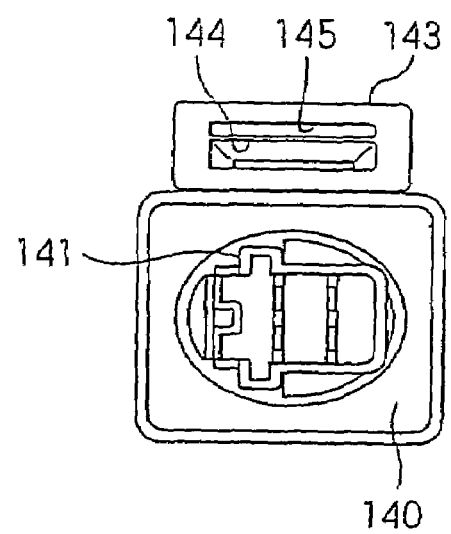
FIG. 6(b) is a side elevation a winker relay of the present invention.

As shown in FIG. 6, the winker relay 140 is provided with a coupler 141 having a IGN terminal, BAT terminal, LOAD terminal and EARTH terminal, and has an mounting piece 142 formed on a side surface. The winker relay 140 is fitted to the vehicle body by inserting this mounting piece 142 into one through hole 144 of a mounting rubber 143, and fitting a vehicle body side stay, not shown, into another through hole 145.

Returning to FIG. 7, the winker relay 140 has the IGN terminal connected to the battery 120 via the fuse 171, the ignition switch 130, and the main fuse 172. The BAT terminal is normally connected to the battery 120 via the fuse 173 and the main fuse 172. Also, the LOAD terminal for outputting current for flashing each of the winkers 111-114 is connected to a moving contact 151 that is driven by operation of the winker switch 150. The EARTH contact is connected to ground.

The respective left and right winkers 111, 112, and 113, 114 are connected to the left and right fixed contacts 152, 153 of the winker switch 150. By bringing the moving contact 151 into contact with either of the left and right fixed contacts 152, 153 the LOAD terminal of the winker relay 140 is selectively connected to left winkers 111, 112 or the right winkers 113, 114.

Also, a normally open hazard switch 160 is connected in parallel between the movable contact 151 and the left and right fixed contacts 152, 153 of the winker switch 150. By turning the movable contact 161, the fixed contacts 162-164 are short circuited to collectively connect the LOAD terminal of the winker relay 140 to the left and right winkers 111-114 regardless of the position of the movable contact 151 of the winker switch 150.

Figure 8:
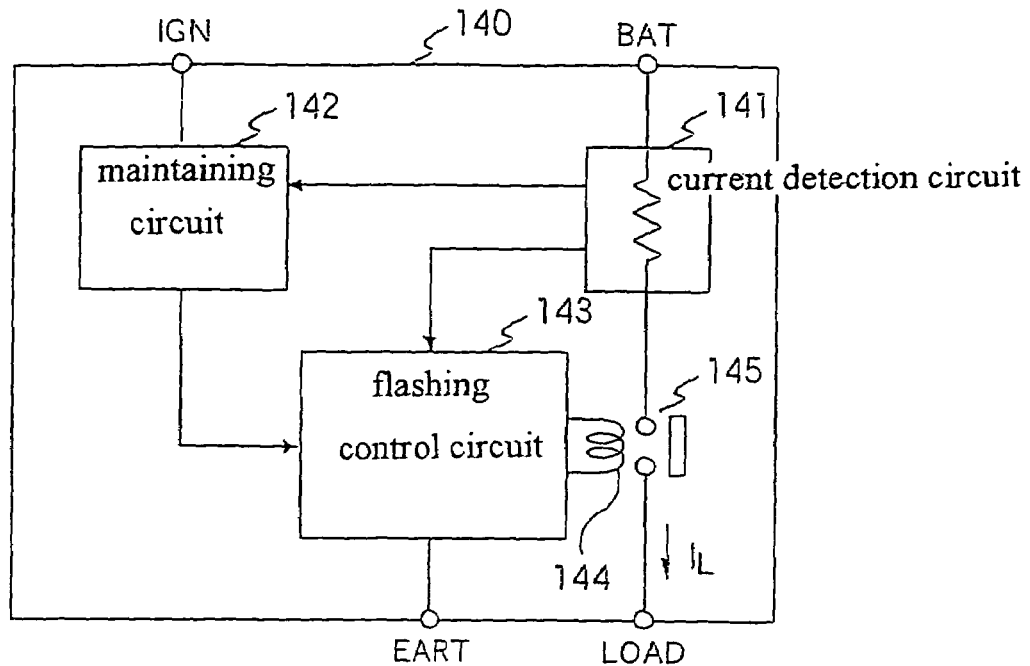
FIG. 8 is a block diagram showing the schematic structure of a winker relay of the present invention.

FIG. 8 is a block diagram showing the schematic structure of the winker relay 140. The winker relay 140 is constructed using an IC (integrated circuit), and is comprised of a current detection circuit 141 connected to the BAT terminal for detecting current flowing in each of the winkers 111-114. A maintaining circuit 142 is connected to the IGN terminal for maintaining flashing of the winkers 111-114 based on current detected by the current detection circuit 141. A flashing control circuit 143 controls flashing of the winkers 111-114. A relay coil 144 is excited in response to output of the flashing control circuit 143. A relay contact 145 is opened and closed in response to energizing of the relay coil 144 for outputting flashing current to the winkers 111-114 via the LOAD terminal.

The relay made up of the relay coil 144 and the relay contact 145 is not limited to the mechanical relay of this embodiment. It is possible to construct the relay with a semiconductor relay comprised of transistors, etc.

In the winker relay 140 having the above-described structure, current supplied from the BAT terminal and output from the LOAD terminal via the current detection circuit 141 and the relay contact 145 can be varied according to each function of the winker unit in accordance with operation of the winker switch 150 and the hazard switch 160 shown in FIG. 7. Table 1 shows criteria for determining each function of the winker unit 100 using current value IL detected by the current detection circuit. The flashing rate of the winker according to each function and control when the main switch is turned off are shown together.

TABLE 1

| detected current range | function | flashing rate | control after main switch is turned off |
|---|---|---|---|
| IL < 1.5 IB | disconnect alarm | double speed | Stop flashing |
| 1.5IB ≦ IL ≦ 3IB | left or right turn indication | normal speed | Stop flashing |
| 3IB < IL | hazard | normal speed | maintain flashing |

Operation of the winker unit of this embodiment will now be described with reference to FIG. 7, FIG. 8 and Table 1.

First of all operation of the left or right turn indicator function of the winker unit 100 will be described. If the key is inserted into the vehicle and the ignition switch 130 is turned on, power is supplied from the power supply 120 through the main fuse 172 and fuse 171 to the winker relay 140. In response to the vehicle tuning, if the winker switch 150 is thrown to the left or to the right, the moving contact 151 is brought into contact with either of the fixed contacts 152 and 153. A winker flashing signal generated by the flashing control circuit and switched by the relay contact 145 is output from the LOAD terminal of the winker relay 140, and is supplied to one of either the left winkers 111, 112 or the right winkers 113, 114. In this way, the winkers 111 and 112 or 113 and 114 on the side to which the winker switch is thrown are flashed.

The winker switch 150 is internally urged so as to return to a neutral state. After the winker switch operation, the winker switch 150 returns to an original position (neutral) while maintaining a connected state. After winker operation, the winker is released by pushing the winker switch 150 forwards.

The current flowing in each winker 111-114 at this time is detected by the current detection circuit 141 of the winker relay 140. The results of detection are sent to the maintaining circuit 142 and the function of the winker unit 100 currently operating is determined. At the current point in time, one of the left winkers 111, 112 or the right winkers 113, 114 is flashing, which means that the detected current value IB is IL=2IB when current flowing for one winker lamp is IB. If Table 1 is referred to here, IL is in the range 1.5 IB≦IL≦3IB, which means that the function of the winker unit 1 currently operating is determined to be a left or right turning indication. The results of determination are sent to the flashing control circuit 143. When the ignition switch 130 is turned off, control is performed to stop the flashing signal, as shown in Table 1.

Also, during operation of the left or right turn indicating function of the winker unit 100, when the current value IL detected by the current detection circuit 141 of the winker relay 140 is IL<1.5. IB shown in Table 1, it represents that of the two lamps of the left or right winkers 111, 112, or 113, 114 that should be flashing one of the lamps is disconnected, and so the maintaining circuit 142 determines this case to be a disconnection alarm. The flashing control circuit 143 receives this determination and carries out control to make the flashing signal double what it is normally. In this way, the remaining winkers 111-114 are flashed at double the normal speed. It is therefore possible for the driver or rider of the vehicle to see this and know that a winker is disconnected, making it possible to speedily replace the winker lamp.

The operation of the hazard function of the winker unit 100 will now be described. If the hazard switch 160 is turned on with the ignition switch 130 turned on, the fixed contacts 162-164 are short circuited by means of the moving contact 161. In this way, the LOAD terminal of the winker relay 140 and the left and right winkers 111-114 are connected, and all of the winkers 111-114 are flashed at the same time using a flashing signal generated by the flashing control circuit 143 and switched by the relay contact 145.

The current flowing in each winker 111-114 at this time is detected by the current detection circuit 141 of the winker relay 140. The results of detection are sent to the maintaining circuit 142 and the function of the winker unit 100 currently operating is determined. At this point in time, since all of the winkers 111-114 are flashing, the current value IL detected becomes IL=4IB. Using Table 1, if IL satisfies IL>3IB, the function of the winker unit 100 operating at the current time is determined to be a hazard. The results of determination are sent to the flashing control circuit 143. Control is performed to maintain the flashing signal even when the ignition switch 130 is turned off, as shown in Table 1. This state is continued until the hazard switch 160 is turned off. Also, if the hazard switch 160 is turned off temporarily, then even if the hazard switch is turned on again each of the circuits of the winker relay 140 will not operate as long as the ignition circuit is off, and so the flashing signal is not output from the LOAD terminal.

In this way, it is possible to start the hazard state only when the ignition switch 130 is on, and it is possible to remove the key with the vehicle still in the hazard state and move away from the vehicle.

Figure 9:
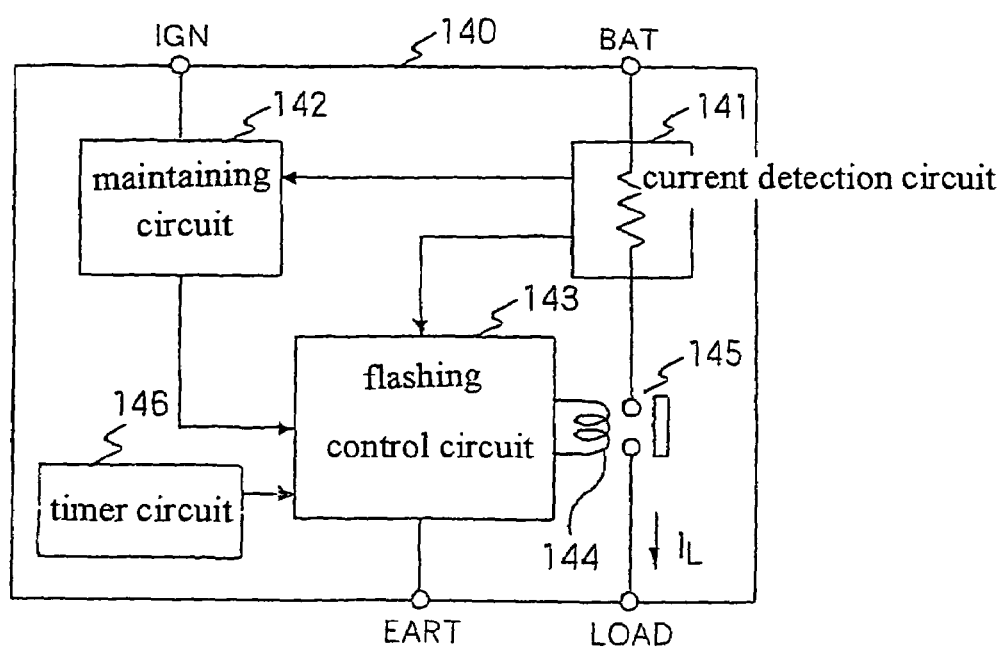
FIG. 9 is a block diagram showing the schematic structure of a modified example of the winker relay of the present invention.

As shown in FIG. 9, it is also possible for the winker relay 140 to be provided with a timer circuit 146 that is started in synchronism with an off operation of the hazard switch 160 while the hazard state is being maintained, for measuring a specified, for example 30 seconds or 1 minute, and to maintain operation of the flashing control circuit 143 while the timer is operating in this way. The flashing signal is output from the LOAD terminal during timer operation, even if erroneous operation is performed during the maintaining of the hazard state to turn off the hazard switch 160, which means that it is possible to return to the hazard state without turning the main switch on by tuning the hazard switch 160 on again.

As described above, according the vehicle winker unit 100 with a hazard maintaining function of this embodiment there are provided left and right winkers 111-114, a battery 120, an ignition switch 130, a winker relay 140 for outputting a flashing signal to the winkers 111-114, a winker switch 150 for selectively connecting output of the winker relay 140 to either of the left and right winkers 111, 112 and 113, 114, and a hazard switch 160 for connecting the output of the winker relay to all of the left and right winkers 111-114. The winker relay 140 is normally connected to the battery 120, and under specified conditions, with this embodiment, a hazard state is determined in a case where the current value flowing in the winkers 111-114 is equivalent to four winker lamps being lit, and current is maintained in order to flash the winkers 111-114 even after the ignition switch 130 is turned off.

In this way, since the winker relay 140 operates even with the ignition switch 130 in an off state, and it is possible to maintain the hazard state, it is possible to maintain a hazard function even if the key is removed and the rider or driver moves away from the vehicle, with a comparatively simple and inexpensive structure without the need to separately provide a relay for the hazard maintaining function, and it is possible to prevent winker flashing due to mischievous behavior of others.

Also, since the winker relay 140 is provided with a current detection circuit 141 for detecting current for flashing the winkers 111-114, and when a first specified current equivalent to a case where the hazard switch 160 is on has been detected by the current detection circuit 141, current for flashing the winkers 111-114 is maintained, the winker relay 140 determines the hazard state by detecting current flowing in the winkers 111-114, and the hazard state is maintained even after the ignition switch 130 is turned off. In this way, it is possible to construct a comparatively simple and inexpensive vehicle winker unit 100 with a hazard maintaining function without the need to separately provide a relay for the hazard maintaining function.

Furthermore, when a second specified current equivalent to a case where any of the left and right winkers 111-114 are disconnected has been detected by the current detection section 141, the winker relay 140 outputs a current for flashing the winkers 111-114 at double speed. Therefore, it is possible to issue a warning by also using the current detection section to detect disconnection of the winkers 111-114, and it becomes possible to detect disconnection without increasing the number of components.

Also, since after the hazard switch 160 has been turned off in a state where current for flashing the winkers 111-114 is being maintained, the winker relay 140 does not output current for flashing the winkers 111-114, even if the hazard switch 160 is turned on again, it is possible to prevent unintentional activation of the hazard function.

In addition, since the winker relay 140 is provided with a timer circuit 146 for measuring a time a current for flashing the winkers 111-114 is maintained for, and when the time measured by the timer circuit 146 is in a first specified range the winker relay 140 maintains current for flashing the winkers 111-114 by turning the hazard switch 160 on again after it has been turned off, it is possible to easily return to the hazard state even if the ignition switch 130 has not been operated as long as the time is short, when the hazard switch 160 is erroneously turned off while the hazard state is being maintained.

Also, since the hazard switch 160 is connected in parallel with the winker switch 150, it is possible to supplement the hazard function by carrying out simple wiring to an already existing winker unit.

Further, since the winker relay 140 is constituted by an IC, it is possible to construct a small sized, lightweight winker relay 140 with a reduced number of components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A winker unit for a vehicle with a hazard maintaining function, comprising:
   a main switch for turning a power supply of the vehicle on or off as a result of key operation;
   a winker relay for outputting current for flashing left and right winkers of the vehicle;
   a winker switch for selectively connecting output of the relay to either the left or right winker; and
   a hazard switch for collectively connecting the output of the winker relay to the left and right winkers,
   wherein the winker relay is normally connected to the power supply, and when the main switch is turned off under specified conditions current for flashing the winkers is maintained;
   wherein the winker relay is provided with a current detection section for detecting current for flashing the winkers, and when a first specified current equivalent to a case where the hazard switch is on has been detected by the current detection section, the winker relay maintains current for flashing the winkers; and
   wherein after the hazard switch has been turned off in a state where current for flashing the winkers is being maintained, the winker relay does not output current for flashing the winkers, even if the hazard switch is turned on again.

2. The winker unit for a vehicle with the hazard maintaining function according to claim 1, wherein when a second specified current equivalent to a case where any of the winkers are disconnected has been detected by the current detection section, the winker relay outputs a current for flashing the winkers at a different rate than at the normal time.

3. The winker unit for a vehicle with the hazard maintaining function according to claim 2, wherein the hazard switch is connected in parallel with the winker switch.

4. The winker unit for a vehicle with the hazard maintaining function according to claim 1, wherein the hazard switch is connected in parallel with the winker switch.

5. The winker unit for a vehicle with the hazard maintaining function according to claim 1, wherein the winker relay is constituted by an IC.

6. A winker unit for a vehicle with a hazard maintaining function, comprising:
   a main switch for turning a power supply of the vehicle on or off as a result of key operation;
   a winker relay for outputting current for flashing left and right winkers of the vehicle;
   a winker switch for selectively connecting output of the relay to either the left or right winker; and
   a hazard switch for collectively connecting the output of the winker relay to the left and right winkers,
   wherein the winker relay is normally connected to the power supply, and when the main switch is turned off under specified conditions current for flashing the winkers is maintained;
   wherein the winker relay is provided with a current detection section for detecting current for flashing the winkers, and when a first specified current equivalent to a case where the hazard switch is on has been detected by the current detection section the winker relay maintains current for flashing the winkers; and
   wherein the winker relay is provided with a timer section for measuring a time a current for flashing the winkers is maintained for, and when the time measured by the timer section is in a first specified range the winker relay maintains current for flashing the winkers by turning the hazard switch on again after it has been turned off.

7. The winker unit for a vehicle with the hazard maintaining function according to claim 6, wherein the hazard switch is connected in parallel with the winker switch.

8. The winker unit for a vehicle with the hazard maintaining function according to claim 6, wherein when a second specified current equivalent to a case where any of the winkers are disconnected has been detected by the current detection section, the winker relay outputs a current for flashing the winkers at a different rate than at the normal time.

9. The winker unit for a vehicle with the hazard maintaining function according to claim 8, wherein the hazard switch is connected in parallel with the winker switch.

10. The winker unit for a vehicle with the hazard maintaining function according to claim 6, wherein the winker relay is constituted by an IC.

11. A winker unit for a vehicle, comprising:
a main switch for turning a power supply of the vehicle on or off;
a relay for flashing left and right winkers of the vehicle;
a switch for selectively connecting an output of the relay to the left or right winker; and
a hazard switch for connecting the output of the relay to the left and right winkers,
wherein the relay is connected to the power supply, and when the main switch is turned off under specified conditions, current for flashing the winkers is maintained;
wherein the relay is provided with a current detection section for detecting current for flashing the winkers, and when a first specified current equivalent to a case where the hazard switch is on has been detected by the current detection section, the relay maintains current for flashing the winkers; and
wherein after the hazard switch has been turned off in a state where current for flashing the winkers is being maintained, the relay does not output current for flashing the winkers, even if the hazard switch is turned on again.

12. The winker unit for a vehicle with the hazard maintaining function according to claim 11, wherein when a second specified current equivalent to a case where any of the winkers are disconnected has been detected by the current detection section, the relay outputs a current for flashing the winkers at a different rate than at the normal time.

13. The winker unit for a vehicle with the hazard maintaining function according to claim 11, wherein the hazard switch is connected in parallel with the switch.

14. The winker unit for a vehicle with the hazard maintaining function according to claim 11, wherein the relay is constituted by an IC.

15. A winker unit for a vehicle, comprising:
a main switch for turning a power supply of the vehicle on or off;
a relay for flashing left and right winkers of the vehicle;
a switch for selectively connecting an output of the relay to the left or right winker; and
a hazard switch for connecting the output of the relay to the left and right winkers,
wherein the relay is connected to the power supply, and when the main switch is turned off under specified conditions, current for flashing the winkers is maintained;
wherein the relay is provided with a current detection section for detecting current for flashing the winkers, and when a first specified current equivalent to a case where the hazard switch is on has been detected by the current detection section, the relay maintains current for flashing the winkers; and
wherein the relay is provided with a timer section for measuring a time a current for flashing the winkers is maintained for, and when the time measured by the timer section is in a first specified range the relay maintains current for flashing the winkers by turning the hazard switch on again after it has been turned off.

16. The winker unit for a vehicle with the hazard maintaining function according to claim 15, wherein when a second specified current equivalent to a case where any of the winkers are disconnected has been detected by the current detection section, the relay outputs a current for flashing the winkers at a different rate than at the normal time.

17. The winker unit for a vehicle with the hazard maintaining function according to claim 15, wherein the hazard switch is connected in parallel with the switch.

18. The winker unit for a vehicle with the hazard maintaining function according to claim 15, wherein the relay is constituted by an IC.

* * * * *